(12) United States Patent
Fritz

(10) Patent No.: US 8,113,496 B2
(45) Date of Patent: Feb. 14, 2012

(54) BEARING MEMBER FOR SUPPORTING AN ELASTIC SUPPORT ELEMENT

(75) Inventor: Michael Fritz, Breckerfeld (DE)

(73) Assignee: ThyssenKrupp Bilstein Suspension GmbH, Ennepetal (DE)

( * ) Notice: Subject to any disclaimer, the term of this patent is extended or adjusted under 35 U.S.C. 154(b) by 1565 days.

(21) Appl. No.: 11/291,397

(22) Filed: Dec. 1, 2005

(65) Prior Publication Data

US 2006/0147137 A1    Jul. 6, 2006

(30) Foreign Application Priority Data

Dec. 1, 2004 (DE) .......................... 10 2004 058 104

(51) Int. Cl.
F16F 1/06 (2006.01)

(52) U.S. Cl. .......................... 267/179; 267/220; 248/613

(58) Field of Classification Search .................. 267/219, 267/220, 179; 384/125, 223; 188/321.11; 280/124.147; 248/613; 403/282, 283
See application file for complete search history.

(56) References Cited

U.S. PATENT DOCUMENTS

| | | | | |
|---|---|---|---|---|
| 3,051,469 A | * | 8/1962 | Boschi | 267/33 |
| 3,301,578 A | * | 1/1967 | Platt et al. | 285/331 |
| 3,444,749 A | | 5/1969 | Ruprecht et al. | |
| 371,735 A | | 2/1973 | Ritter | |
| 3,755,870 A | * | 9/1973 | Young et al. | 29/898.11 |
| 4,116,503 A | * | 9/1978 | Licht | 384/124 |
| 4,175,804 A | * | 11/1979 | Pannwitz | 384/223 |
| 4,415,954 A | * | 11/1983 | Schaefer | 362/202 |
| 4,482,161 A | * | 11/1984 | Izzi, Sr. | 277/606 |
| 4,754,956 A | * | 7/1988 | Barone et al. | 267/140.14 |
| 4,911,416 A | * | 3/1990 | Warmuth, II | 267/64.24 |
| 4,989,884 A | * | 2/1991 | Goodman | 277/391 |
| 5,330,165 A | * | 7/1994 | van Goubergen | 267/141 |
| 5,467,970 A | * | 11/1995 | Ratu et al. | 267/220 |
| 5,467,971 A | * | 11/1995 | Hurtubise et al. | 267/220 |
| 6,007,061 A | * | 12/1999 | Kammel et al. | 267/220 |
| 6,079,700 A | * | 6/2000 | Solomond et al. | 267/221 |
| 6,155,544 A | * | 12/2000 | Solomond et al. | 267/220 |
| 6,273,407 B1 | * | 8/2001 | Germano | 267/221 |
| 6,733,023 B2 | * | 5/2004 | Remmert et al. | 280/124.179 |
| 7,416,175 B2 | * | 8/2008 | Al-Dahhan | 267/220 |
| 2002/0109328 A1 | | 8/2002 | Remmert et al. | |
| 2008/0048370 A1 | * | 2/2008 | Corlet et al. | 267/220 |

FOREIGN PATENT DOCUMENTS

| | | |
|---|---|---|
| DE | 40 21 314 | 5/1991 |
| DE | 4119 701 A1 | 12/1992 |
| DE | 195 16 271 A1 | 11/1996 |
| JP | 2003-254369 | 9/2003 |

* cited by examiner

Primary Examiner — Bradley King
Assistant Examiner — Thomas Irvin
(74) Attorney, Agent, or Firm — Crowell & Moring LLP

(57) ABSTRACT

Annular bearing member for supporting a support element that comprises elastic material and that when installed is under pressure and that is in the area of a suspension strut, whereby the bearing member comprises a material that has a greater hardness than the material of the support element and whereby the bearing member includes a bearing surface upon which the support element with a counter-surface is supported, whereby elevations are arranged encirclingly on the surface of the bearing surface and concentric to one another and form an integral component of the bearing member, whereby every two adjacent elevations limit an encircling receiving space for elastic material of the support element.

22 Claims, 1 Drawing Sheet

BEARING MEMBER FOR SUPPORTING AN ELASTIC SUPPORT ELEMENT

BACKGROUND OF THE INVENTION

The invention relates to an annular bearing member for supporting a support element that comprises elastic material and that when installed is under pressure and that is in the area of a suspension strut, whereby the bearing member comprises a material that has a greater hardness than the material of the support element and whereby the bearing member includes a bearing surface upon which the support element with a counter-surface is supported.

DE-A 41 19 701 is a support element, in particular of a motor vehicle suspension strut, with an air spring that with wall elements with at least one elastic deformable wall encloses a cavity filled with a gaseous substance and that is supported with a first wall element on a support wall and with a second wall element on a suspension body that can be displaced relative to the support wall. The upper end of the piston rod that is axially guided in an external tube is supported air-tight on a rubber bearing. The air spring can be surrounded by a coil spring that is supported, for instance while interposing a damping element, at one end on a support shoulder of the jacket tube and at the other end on a support ring on the exterior tube.

It is disadvantageous that the damping element, which comprises elastic material and which is under pressure from the coil spring, can in particular deform radially given more axial pressure, so that it can potentially project beyond the radial limiting edge of the support ring and under certain circumstances can even be sheared off.

This can be counteracted in that the support element is arranged either in a chamber or is joined to the bearing element, for instance using vulcanization. On the one hand, such measures are not desired and on the other hand additional materials and work steps would be necessary that would cause the product to be more expensive.

The object of the invention is to further develop a generic annular bearing member such that the support element is no longer damaged by deformation as a result of the pressure on the support element so that the service life is improved.

SUMMARY OF THE INVENTION

This object is attained in that elevations are arranged encirclingly on the surface of the bearing surface and concentric to one another and form an integral component of the bearing member, whereby every two adjacent elevations limit an encircling receiving space for the elastic material of the support element.

The profile created by deforming technology impressing or deep drawing, which may be expressed in German as "umformtechnische Einpraegung," on the bearing surface of the bearing member that comprises for instance steel can have a variety of very different designs, whereby what is significant is that receiving spaces for the elastic material of the support element are formed such that when operating a type of clamping or engagement is achieved between bearing member and support element, so that the elastic material of the support element can no longer escape in areas that lead to the damages thereof that were described in the foregoing.

Depending on the pressure, the elevations can be from 0.1 to 0.7 mm high, preferably from 0.3 to 0.5 mm high.

Particularly advantageous cross-sections are obtained using elevations embodied with notch shapes.

In accordance with another idea of the invention, the notch-shaped elevations can have a asymmetrical cross-section.

As seen from the notch tips, the elevations can have one edge that drops radially outward that drops less steeply than a second edge of the elevation that drops radially inward. In this manner the elevations attain a greater supporting effect in the outward radial direction.

Alternatively, it is also possible that the elevations, seen from the notch tips, have a first edge that drops radially outward and a second edge that projects perpendicular from the bearing surface. In this case the supporting effect of the notch shapes is particularly high in the outward radial direction.

Advantageously, the inventive bearing member is embodied as a spring plate for receiving a coil spring of a vehicle suspension strut, whereby however other types of application options are also conceivable, for instance in the area of the rubber bearing of the suspension strut, with respect to peripherally cooperating components. For example, vibration decoupling or acoustic decoupling can be undertaken here.

Should the bearing member not comprise a metal, there is the option to embody it as a plastic injection-molded part, whereby the elevations are formed by an appropriate design of the injection molding tool while the bearing member is being produced.

The application of the subject of the invention can thus be in the area of a suspension strut, specifically anywhere that rubber or elastomer disks are used under pressure. This also includes tolerance compensating disks or acoustic or mechanical uncoupling elements (noise or vibration decoupling).

Compared to the prior art, preventing the rubber from moving out of the area of the bearing member stabilizes the support element, which substantially improves its service life. With the invention, the support element is stabilized and fixed without additional measures, e.g. vulcanization.

The subject of the invention is illustrated using an exemplary embodiment in the drawings and is described as follows.

BRIEF DESCRIPTION OF THE DRAWINGS

FIG. 1 includes a partial area of a motor vehicle suspension strut 1 as is addressed for instance in the prior art in accordance with DE-A 41 19 701. Illustrated is an annular, angular bearing member 2 that is for instance shrunk on or welded to the suspension strut 1 and that is mechanically linked to a support body 3 that comprises an elastic material and that in this example has receiving areas 4 for the end region of a coil spring (not shown). Reference character F indicates the force exerted by the coil spring on the support element 3. If a bearing member was used here, as described in the prior art, the elastic material of the support element 3 that is axially stressed with the force F would be pressed radially outward and would possibly be sheared off on the outer edge 5 of the bearing member 2. Due to the constant flexing work of the elastic support body 3, material fatigue and wear occur relatively rapidly, reducing service life. It would be possible to enclose the support element 3 in the area of the bearing member 2, but this would require additional production steps involving additional costs. Further disadvantages associated with enclosure would be the increased weight of the bearing member 2 and the additional space required. The bearing member 2 has a bearing surface 6 that is mechanically linked to a counter-surface 7 of the bearing element 3.

Figure 1:
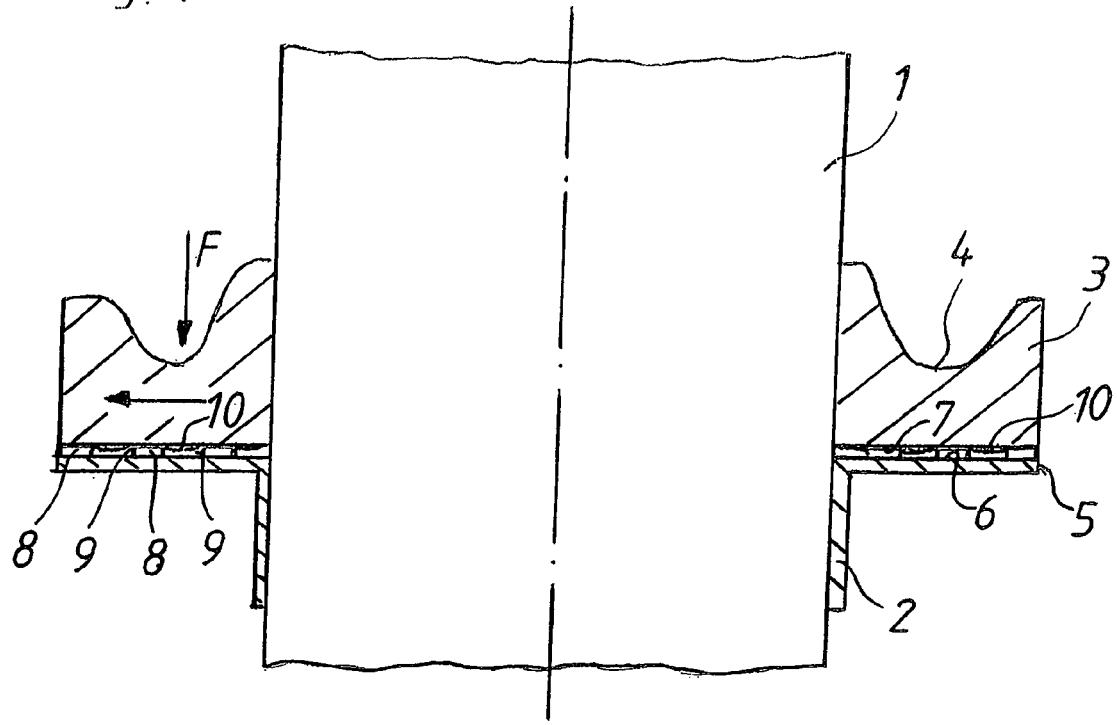
FIG. 1 is cross-section view of a first embodiment of the invention.

In accordance with the invention, in FIG. 1 embodied on the surface of the bearing surface 6 of the bearing member 2 are elevations 8 that are arranged encirclingly and concentric to one another and that furthermore are integral components of the bearing member 2. Encircling receiving spaces 9 for the elastic material of the support element 3 are formed between each two adjacent elevations 8. In the example illustrated, the elevations 8 should have an approximately rectangular cross-section so that the receiving spaces 9 likewise have a rectangular cross-section. It is merely indicated by broken lines how elastic material 10 of the support element 3 is pressed at least partially into the respective receiving spaces 9 under pressure so that the outward radial movement of the support element 3 is reduced and radially supported.

Figure 2:
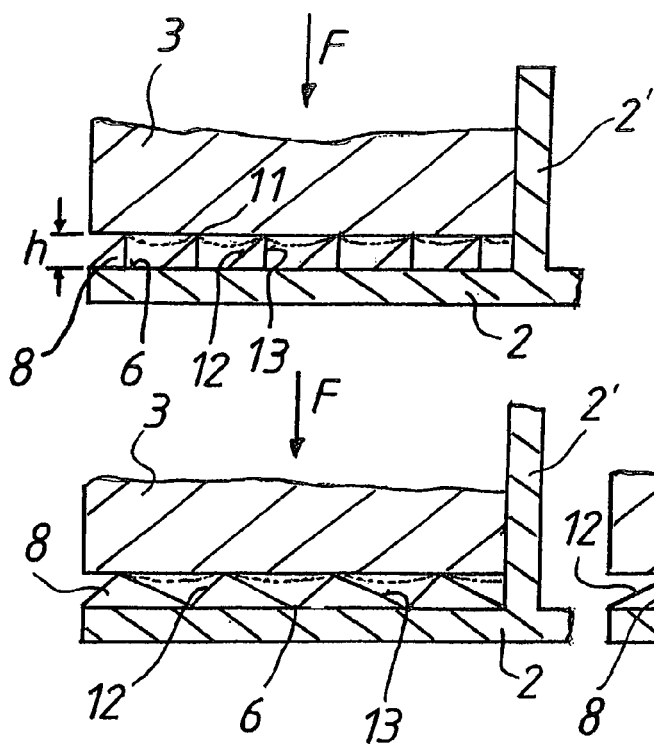
FIGS. 2 through 4 are cross-sectional views of additional embodiments of the invention.
Figure 3:
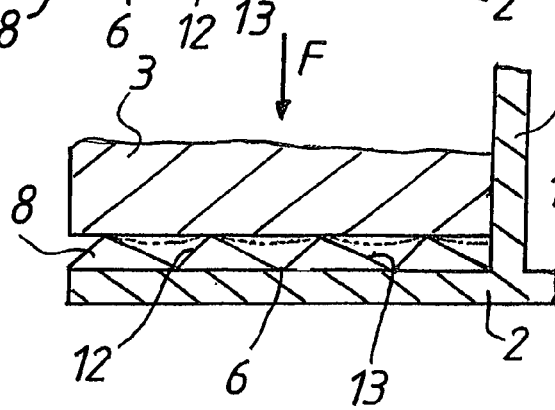
Figure 4:
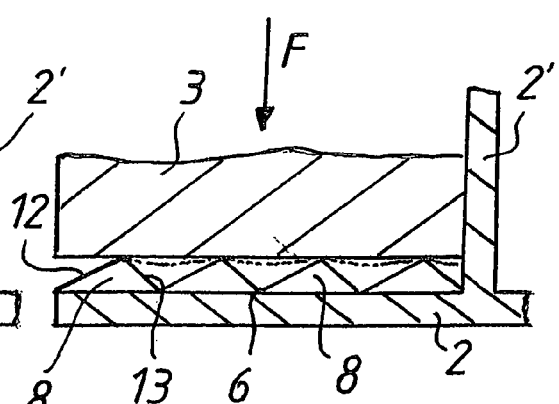

FIGS. 2 through 4 show other examples of bearing members 2 of the invention that are also mechanically linked to elastic support elements 3, whereby differently configured elevations 8 are provided on the surface 6 of each bearing member 2. In contrast to FIG. 1, the elevations 8 are provided with notch-shaped cross-sections and have asymmetrical cross-sections. Each bearing member 2 cooperates with a support area 2' that runs substantially perpendicular thereto.

Seen from the notch tips 11, the elevations 8 have an edge 12 that drops radially outward and an edge 13 that runs at another angle thereto.

In FIG. 2, the edge 12 runs radially outward at a predetermined angle, while the edge 13 is perpendicular to the surface 6. The height of the elevations is measured from the base thereof, as illustrated by "h" in FIG. 2 as an example. In FIGS. 3 and 4, the edges 12, 13 run at different angles of inclination, whereby in FIG. 3 the edge 12 is steeper than the edge 13 and in FIG. 4 the reverse is depicted.

Additional alternatives to the configuration of profiles on the surface 6 of the bearing member 2 are also conceivable.

If the bearing number 2 comprises steel, the elevations 8 can be added for instance by deforming technology impressing or deep drawing into the surface 6 of the bearing member 2.

If the bearing member 2 comprises plastic, for instance, corresponding profiles can be added to the associated mold part in order to produce very different contours, such as are depicted for instance in FIGS. 1 through 4.

As addressed in the foregoing, it is not only bearing members 2 that are mechanically linked to coil springs that can be embodied in this manner, but rather there is also the option of designing other types of components that are under pressure and that comprise very different materials, as they are formed for instance in the area of the rubber bearing. The elastomer parts previously formed by vulcanization can then be stabilized and held fixed in a suitable shape as a result of mechanical clamping/positive-fit engagement between bearing member and support element without additional measures.

LIST OF REFERENCE CHARACTERS

1 Suspension strut
2 Bearing member
2' Support area
3 Support body
4 Receiving area
5 Outer edge
6 Bearing surface
7 Counter-surface
8 Elevations
9 Receiving space
10 Elastic material
11 Notch tip
12 Edge
13 Edge
F Force
h Height

The invention claimed is:

1. A suspension assembly, comprising:
   a suspension strut;
   a coil spring having an end portion;
   a support element which comprises elastic material, said support element receiving said end portion of said coil spring; and
   an annular bearing member having a first side for facing the suspension strut and a second side having bearing surfaces facing the support element, said annular bearing member comprising a material of greater hardness than the elastic material of the support element, the bearing surfaces being configured as concentric elevations radially spaced apart by annular receiving spaces such that when said support element is urged in a direction of said annular bearing member under pressure by said coil spring, the concentric elevations are pressed into said elastic material, which is deformed so as to be at least partially received in said annular receiving spaces.

2. The suspension assembly according to claim 1, wherein the concentric elevations have a substantially perpendicular annular wall facing radially inward thereof and perpendicular to a radial direction of the annular bearing member.

3. The suspension assembly according to claim 1, wherein the elevations are 0.1 mm to 0.7 mm in height.

4. The suspension assembly according to claim 1, wherein the elevations are 0.3 mm to 0.5 mm in height.

5. The suspension assembly according to claim 1, wherein the elevations are of triangular cross-section of greatest width at a base of the elevations at said second side of said annular bearing member.

6. The suspension assembly according to claim 5, wherein the triangular cross-section of the elevations is asymmetrical.

7. The suspension assembly according to claim 5, wherein the triangular cross-section is a triangle having two sides meeting the base of the triangle at respective locations radially spaced on the annular bearing member, and for respective ones of said elevations a more radially inward one of said sides is shorter than another of said two sides.

8. The suspension assembly according to claim 5, wherein the triangular cross-section of the elevations is a right triangle.

9. The suspension assembly according to claim 1, wherein the annular bearing member is comprised of steel and the elevations are formed by deep drawing.

10. The suspension assembly according to claim 1, wherein the annular bearing member is comprised of a plastic which is injection molded so as to include the elevations.

11. The suspension assembly according to claim 1, wherein a lower surface of the support element, which faces the bearing surfaces of the annular bearing member, is substantially flat.

12. A suspension assembly, comprising:
   a suspension strut;
   a coil spring having an end portion;
   a support element comprised of an elastic material, said support element receiving said end portion of said coil spring; and
   an annular bearing member including a first side oriented to face the suspension strut for affixing thereto and a second side presenting a bearing surface facing in an axial direction of said suspension strut, said second side including elevations thereon that are arranged encircling and radially spaced apart from one another which are engageable with a contact surface of the support element, each radially adjacent pair of said elevations delimiting a receiving space therebetween, said annular engaging member comprising a material of greater hardness than a corresponding material of the support element such that when said contact surface of said support element is urged against said elevations by said coil spring, said corresponding material of said support element is pressed at least partially into each said receiving space under pressure so that the outward radial movement of the support element is reduced and the support element is radially supported.

13. The suspension assembly according to claim 12, wherein the concentric elevations have a substantially perpendicular annular wall facing radially inward thereof and perpendicular to a radial direction of the annular bearing member.

14. The suspension assembly according to claim 12, wherein the elevations are 0.1 mm to 0.7 mm in height.

15. The suspension assembly according to claim 12, wherein the elevations are 0.3 mm to 0.5 mm in height.

16. The suspension assembly according to claim 12, wherein the elevations are of triangular cross-section of greatest width at a base of the elevations at said second side of said annular bearing member.

17. The suspension assembly according to claim 16, wherein the triangular cross-section is a triangle having two sides meeting the base of the triangle at respective locations radially spaced on the annular bearing member, and for respective ones of said elevations a more radially inward one of said sides is shorter than another of said two sides.

18. The suspension assembly according to claim 16, wherein the triangular cross-section of the elevations is a right triangle.

19. The suspension assembly according to claim 12, wherein the annular bearing member is comprised of steel and the elevations are formed by deep drawing.

20. The suspension assembly according to claim 12, wherein the annular bearing member is comprised of a plastic which is injection molded so as to include the elevations.

21. The suspension assembly according to claim 12, wherein the triangular cross-section of the elevations is asymmetrical.

22. The suspension assembly according to claim 12, wherein the contact surface of the support element is substantially flat.

* * * * *